United States Patent
Haas et al.

(10) Patent No.: US 7,919,001 B2
(45) Date of Patent: Apr. 5, 2011

(54) WATER PURIFICATION SYSTEM AND METHOD USING REVERSE OSMOSIS REJECT STREAM IN AN ELECTRODEIONIZATION UNIT

(75) Inventors: William Haas, Norfolk, VA (US); Joel Robinson, Moundsville, WV (US); Abel Queen, Norfolk, VA (US)

(73) Assignee: GE Mobile Water, Inc., Norfolk, VA (US)

(*) Notice: Subject to any disclaimer, the term of this patent is extended or adjusted under 35 U.S.C. 154(b) by 173 days.

(21) Appl. No.: 12/275,301

(22) Filed: Nov. 21, 2008

(65) Prior Publication Data

US 2009/0139932 A1 Jun. 4, 2009

Related U.S. Application Data

(62) Division of application No. 10/840,249, filed on May 7, 2004, now Pat. No. 7,470,366.

(51) Int. Cl.
*B01D 61/44* (2006.01)
*B01D 61/02* (2006.01)
*B01D 61/08* (2006.01)
*B01D 61/48* (2006.01)

(52) U.S. Cl. .......... 210/641; 210/651; 210/748.01; 210/202; 210/259; 210/263; 204/520; 204/535; 204/627

(58) Field of Classification Search .......... None
See application file for complete search history.

(56) References Cited

U.S. PATENT DOCUMENTS

| | | | |
|---|---|---|---|
| 3,639,231 A | 2/1972 | Bresler | |
| 4,808,287 A | 2/1989 | Hark | |
| 5,238,574 A | 8/1993 | Kawashima et al. | |
| 5,316,637 A | 5/1994 | Ganzi et al. | |
| 5,458,781 A * | 10/1995 | Lin .............. | 210/651 |
| 5,925,255 A | 7/1999 | Mukhopadhyay | |
| 5,997,745 A | 12/1999 | Tonelli et al. | |
| 6,056,878 A | 5/2000 | Tessier et al. | |
| 6,110,375 A | 8/2000 | Bacchus et al. | |
| 6,187,201 B1 | 2/2001 | Abe et al. | |
| 6,248,226 B1 | 6/2001 | Shinmei et al. | |
| 6,274,019 B1 | 8/2001 | Kuwata | |
| 6,303,037 B1 | 10/2001 | Tamura et al. | |
| 6,379,518 B1 | 4/2002 | Osawa et al. | |
| 6,537,456 B2 | 3/2003 | Mukhopadhyay | |

(Continued)

FOREIGN PATENT DOCUMENTS

DE 4135166 A1 5/1992

(Continued)

OTHER PUBLICATIONS

H. C. Valcour, Jr., "Triple Membrane Makeup Water Treatment at Four Nuclear Power Plants," Ionics, Inc., Proceedings 52nd Annual Meeting International Water Conference®, Oct. 1991, pp. 97-102.

(Continued)

*Primary Examiner* — Krishnan S Menon
(74) *Attorney, Agent, or Firm* — Wegman, Hessler & Vanderburg

(57) ABSTRACT

A method for purifying water, comprising separating a supply stream into a permeate stream and a reject stream, removing non-monovalent salt impurities from the reject stream to produce a treated stream; providing the treated stream to a concentrating compartment of an electrodeionization unit; and, producing an EDI product stream of purified water.

7 Claims, 4 Drawing Sheets

U.S. PATENT DOCUMENTS

| | | |
|---|---|---|
| 6,565,726 B2 | 5/2003 | Sato |
| 2002/0020626 A1 | 2/2002 | Sato |
| 2002/0125137 A1 | 9/2002 | Sato et al. |
| 2002/0125191 A1 | 9/2002 | Mukhopadhyay |
| 2002/0153319 A1 | 10/2002 | Mukhopadhyay |
| 2003/0034292 A1 | 2/2003 | Rela |
| 2004/0188352 A1 | 9/2004 | Dey et al. |

FOREIGN PATENT DOCUMENTS

| | | |
|---|---|---|
| WO | WO 97/46492 | 12/1997 |
| WO | WO 2004/013048 A2 | 2/2004 |
| WO | WO 2004/013048 A3 | 2/2004 |

OTHER PUBLICATIONS

Membranes the Finest Filtration, GE Water Technologies, http://www.gewater.com/library/tp/698_Membranes_the.jsp, accessed Nov. 17, 2003, pp. 1-8.

U. Lachish, "Osmosis Reverse Osmosis and Osmotic Pressure what they are," guma science, http://urila.tripod.com/, accessed Aug. 21, 2003, pp. 1-3.

Howstuffworks, "How Does Reverse Osmosis Work?", Media Network, http://www.howstuffworks.com/question29.htm, accessed Aug. 21, 2003, pp. 1-3.

U. Lachish, "Optimizing the Efficiency of Reverse Osmosis Seawater Desalination," guma science, http://urila.tripod.com/Seawater.htm, accessed Aug. 21, 2003, pp. 1-16.

L.-S. Liang and L. Wang, "Continuous Electrodeionization Processes for Production of Ultrapure Water," U.S. Filter, 2001 Semiconductor Pure Water and Chemicals Conference, http://www.ionpuretech.com/techLib/storage/SPWCC2001.pdf, accessed Sep. 14, 2004.

C. Edmonds and E. Salem, "Demineralization: An Economic Comparison Between EDI and Mixed-Bed Ion Exchange," Ultrapure Water®, Nov.1998, pp. 43-47, http://www.gewater.com/pdf/glegg/EDIvsMixedBed.pdf, accessed Sep. 15, 2004.

"Design and Use of HYDRAcap®—Hollow Fiber Ultrafiltration Module," Hydranautics, *Technical Applications Bulletin—TAB 107*, Nov. 2001.

"Technical Information—HYDRAcap", http://www.membranes.com/technical/tech_specs/techspecs_hydracap.htm, accessed Jul. 26, 2004.

Electropure EDI, Inc., EDI Manual Version 2.52 (XL), Mar. 2003.

"Series- H- Water Softening NF Membrane Elements", http://www.gewater.com/equipment/membranehousing/281_Series-_H-.jsp, accessed Apr. 12, 2005.

"HYDRAcap Advantage", http://www.hydranautics.com/products/product_hc_adv.htm, accessed Apr. 12, 2005.

"Series P UF Membrane Elements", GE Water & Process Technologies, http://www.gewater.com/equipment/membranehousing/305_Series_P-.jsp, accessed Jul. 26, 2004.

"DESAL TM Membrane Products: PT8040F", GE Osmonics, Jan. 27, 2004.

"Series- E- Membrane Elements", GE Water & Process Technologies, http://www.gewater.com/equipment/membranehousing/239_Series-_E-.jsp, accessed Jul. 26, 2004.

"Microfiltration Membrane Elements", GE Infrastructure Water & Process Technologies, http://www.gewater.com/equipment/membranehousing/2010_Microfiltration.jsp, accessed Jun. 10, 2005.

"Membranes the Finest Filtration", GE Infrastructure Water & Process Technologies, http://www.gewater.com/library/tp/698_Membranes_the.jsp, accessed Jun. 10, 2005.

"Series P- UF Membrane Elements", GE Infrastructure Water & Process Technologies, http://www.gewater.com/equipment/membranehousing/305_Series_P-.jsp, accessed Jun. 10, 2005.

"Electropure EDI: High Technology Water", http://www.electropure-inc.com/edihome.htm, accessed May 27, 2005.

"Appendix #7: EDI Power Consumption and Electrical Cost", Electropure EDI Inc., 2001, Version 2.33 XL—Mar. 2001.

"Triple Membrane Trailer", Ionics, http://www/ionics.com/products/WaterFoodChemical/Ultrapure/tmt_ii.htm, accessed Jun. 26, 2003.

"Ionics EDI Equipment Data Sheet: EDI-50", Rev 1.1 Apr. 2, 2001.

"A study of the electrodeionization process—high-purity water production with a RO/EDI system", J. Wang et al., Desalination v. 132, pp. 349-352 (2000).

* cited by examiner

WATER PURIFICATION SYSTEM AND METHOD USING REVERSE OSMOSIS REJECT STREAM IN AN ELECTRODEIONIZATION UNIT

CROSS REFERENCE TO RELATED APPLICATIONS

This application is a divisional of pending U.S. application Ser. No. 10/840,249, filed May 7, 2004.

BACKGROUND OF THE INVENTION

1. Field of the Invention

The present invention relates to a water purification system. More particularly, a water purification system in which a reject stream from a reverse osmosis unit is presented.

2. Description of the Related Art

Highly purified water having a small concentration of ions and other contaminants is required for a number of industrial applications. For example, highly purified water must be used in the manufacture of electronic microchips; mineral contaminants can induce defects. Highly purified water is used in the power generation industry to minimize the formation of scale on the interior of pipes and thereby ensure good heat transfer within and unrestricted water flow through heat exchange systems. The use of highly purified water reduces the formation of scale and deposits in water lines of heat exchange systems, thus extending the time interval between required maintenance procedures. The time interval between required maintenance procedures of a heat exchanging system should be as long as possible. Prolonging the time interval between required maintenance procedures is of particular importance in nuclear power systems, which require complex and expensive shutdown and startup procedures and adherence to radiation safety protocols.

Several technical approaches towards water purification exist, including the use of ion-exchange resins. However, the need to periodically regenerate ion-exchange resins requires a complex arrangement of pumps, piping, valves, and controls with associated large capital and maintenance costs and the use of regenerating chemicals which must be disposed of as chemical waste.

An alternative approach towards water purification is electrodialysis. An electrodialysis unit can include a positively charged anode, a negatively charged cathode, and alternating concentrating compartments and diluting compartments interposed between the anode and cathode. The electrical field established between the electrodes is understood to cause negatively charged anions to diffuse towards the anode and positively charged cations to diffuse towards the cathode. The concentrating compartments and diluting compartments are separated by compartment-separation ion-exchange membranes. An anion-exchange membrane bounds a diluting compartment on the side closer to the anode and allows anions to pass through while restraining the passage of cations. A cation-exchange membrane bounds a diluting compartment on the side closer to the cathode and allows cations to pass through while restraining the passage of anions. Direct electrical current is made to flow between the anode and the cathode to remove ions from the diluting compartments and concentrate ions in the concentrating compartments. A diluting feed stream of water can be continuously provided to the diluting compartments and a concentrating feed stream can be continuously provided to the concentrating compartments. The product stream flowing out of the diluting compartments is purified and contains a smaller concentration of ions than the diluting feed stream; the product stream can be further purified or can be provided to an industrial process for use. The concentrate effluent stream flowing out of the concentrating compartments contains a larger concentration of ions than the concentrating feed stream and can be recycled or discharged to a waste unit. An electrodialysis unit does not require the use of regenerating chemicals. Electrodialysis units are manufactured by Ionics, Incorporated of Watertown, Mass.

A water purification system should be energy efficient, i.e., should consume the least amount of energy per unit volume of purified water produced as is possible. Energy can be consumed, for example, in increasing the pressure of a supply stream of water in order to drive permeate through a membrane that filters out impurities, or in applying direct current across electrodes to drive ions into concentrating compartments in an electrodialysis unit. In an electrodialysis unit, it is understood that a large resistance, i.e., a small conductance, across the diluting compartment, the concentrating compartment, or both can result in a large fraction of the electrical energy supplied being dissipated as heat without driving the motion of many ions. This problem can be addressed in part by ensuring a large concentration of ions in the concentrating compartment by, for example, recycling the concentrate effluent stream to the entrance of the concentrating compartment or by adding salt to the concentrating feed stream.

The problem of small conductance across the diluting compartment is addressed with an electrodeionization unit. The basic design of an electrodeionization unit is similar to that of an electrodialysis unit. However, diluting compartments of an electrodeionization unit contain ion-exchange beads which increase conductance across the diluting compartment. The ion-exchange beads have positively and negatively charged sites; 20 these sites facilitate the efficient migration of ions through the diluting compartment even when the conductivity of the diluting feed stream is low. An electrodeionization unit is capable of producing higher purity water than an electrodialysis unit.

Electrodeionization units can require periodic maintenance to clean or replace compartment separation membranes which have become fouled and through which the passage of ions has become impeded. Compartment separation membranes can become fouled through the deposition of scale formed from polyvalent ions such as Caa+ and $M_e$ and counterions. Deposition of other impurities, such as bacteria, can also foul compartment separation membranes. Furthermore, although an electrodeionization unit can be effective at separating minerals from water, it may not efficiently remove other contaminants, such as organic carbon or bacteria. To address these problems, a filter for reducing the concentration of polyvalent ions and non-mineral impurities, such as organic carbon and bacteria, can be included upstream of the electrodeionization unit: the filter permeate stream can be provided as the diluting feed stream to the diluting compartment of the electrodeionization unit. A reverse osmosis unit with a reverse osmosis membrane can remove most bacteria, most organic carbon with a molecular weight greater than about 150 g/mol, and a large fraction of polyvalent ion impurities. Therefore, by providing a reverse osmosis permeate stream as the diluting feed stream, fouling of a compartment separation membrane from the side of the diluting compartment can be slowed or eliminated. The EDI product stream (electrodeionization product stream) exiting the diluting compartment can have a concentration of non-mineral impurities such as bacteria and organic carbon and a concentration of ions substantially reduced from the concentrations in a supply stream provided to the reverse osmosis unit.

As mentioned above, the concentrating feed stream should contain a large concentration of ions so that the conductance across the concentrating compartments is large. In one approach to ensure a large concentration of ions in the concentrating compartments, a water purification system incorporates a recycle pump which cycles the concentrate effluent stream exiting the concentrating compartment of the electrodeionization unit back to be used as the concentrating feed stream provided to the concentrating compartments. The subsystem including the recycle pump, piping connecting the recycle pump to the inlets and outlets of concentrating compartments, and concentrating compartments can be termed a concentrate loop. As ions are driven by the applied direct current from the diluting compartments into the concentrating compartments, the concentration of ions in the 5 concentrate loop, including the concentrating compartments, increases. Eventually, a large concentration of ions in the concentrating compartments can result in a lnc conductance across the concentrating compartments. However, when the electrodeionization system is first started, there will only be a small concentration of ions in the concentrating compartments, and, therefore, only small conductivity of the fluid in the concentrating compartments and small conductance across the concentrating compartments. To increase the conductivity of the fluid in and the conductance across the concentrating compartments, salt as a source of ions can initially be injected into the concentrate loop.

Polyvalent ions driven from the diluting compartments into the concentrating compartments can accumulate in a concentrate loop. When the concentration of accumulated polyvalent ions becomes sufficiently large, the polyvalent ions with associated counterions can precipitate as scale on the side of a compartment separation membrane adjacent to a concentrating compartment and thereby foul the membrane. Furthermore, bacteria, over time, can grow in the concentrate loop and deposit on and foul the compartment separation membranes. In order to remove impurities from the concentrate loop, a bleed from the concentrate loop is required. Because fluid in the concentrate loop is continuously bled off, the fluid must be made up by additional fluid continuously provided to the concentrate loop. In U.S. Pat. No. 6,056,878 to Tessier et al., FIG. 3 illustrates that the reverse osmosis permeate is provided to the diluting compartments and is provided as make up water to the concentrate loop. The reverse osmosis membrane filters out polyvalent ions and bacteria; as a result, the use of the reverse osmosis permeate in the concentrate loop can reduce the rate of fouling of the compartment separation membranes from the rate if unfiltered supply water were used. However, the use of the reverse osmosis permeate requires a larger capacity reverse osmosis unit for a given volumetric rate flow of an EDI product stream than if the reverse osmosis unit permeate were not used as make up for the concentrate loop, resulting in greater complexity and capital costs.

The ratio of the flow rate of the EDI product stream to the flour rate, of the supply stream can range between zero and one; the closer the ratio is to one, the more efficiently a water purification system uses water in the supply stream. A system providing reverse osmosis permeate to the diluting compartments and using reverse osmosis permeate as make up for a concentrate loop consumes more supply water in the supply stream per unit volume of purified water in the EDI product stream, than if the reverse osmosis permeate were not used as make up. That is, the ratio of the flow rate of the :EDI product stream to the flow rate of the supply stream provided to the reverse osmosis unit is decreased from the ratio where reverse osmosis permeate is not used as make up. The system is therefore more expensive to operate and less environmentally friendly than if reverse osmosis permeate were not used as make up.

The recycle pump and the piping, valves, and controls associated with a concentrate loop add to the capital and maintenance costs of a water purification system and add to the bulk and weight of the system. The additional bulk and weight renders the system more difficult to transport and more difficult to install in confined spaces. The recycle pump increases the power required by the system to produce a unit volume of purified water in the EDI product stream.

An antiscalant agent can be injected into the concentrating feed stream to prevent or delay the precipitation of polyvalent ions and associated counterions as scale. An antiscalant agent injection device contributes to capital and maintenance costs and increases the bulk and weight of a water purification system. Similarly, an antibacterial agent can be injected into the concentrating feed stream, but the antibacterial agent must eventually be 5 disposed of as waste, and an antibacterial injection device contributes to capital and maintenance costs and increases the bulk and weight of the system.

The reverse osmosis permeate has no more than a small concentration of ions, including monovalent ions. When the reverse osmosis permeate is added as makeup to the concentrate loop to compensate for a continuous bleed, the concentration of ions in the concentrate loop, including the concentrating compartments, can be small. To maintain a large conductance across the concentrating compartments, a large concentration of ions in the concentrate loop must be maintained. To maintain a large concentration of ions, make up salt, e.g., monovalent salt, can be injected into the concentrate loop. In a monovalent salt, the ions which associate to form the salt are monovalent; sodium chloride is an example of a monovalent salt. In general, the concentration of monovalent salt in a concentrating compartment of an electrodeionition unit is such that monovalent salt is not deposited as scale; if monovalent salt does deposit as scale, it can be easily removed. However, a salt injection device has associated capital and maintenance costs and increases the bulk and weight of a water purification system. The salt added is eventually bled from the concentrate loop and must be disposed.

FIG. 5 of U.S. Pat. No. 6,056,878 to Tessier illustrates a system with two reverse osmosis units in series. As described in the patent document, the permeate stream from the first reverse osmosis unit is provided to the second reverse osmosis unit. The reject stream from the second reverse osmosis unit can be recycled back to the supply stream to the first reverse osmosis unit, discharged as waste, or provided as make up to the concentrate loop, in which fluid is cycled through the concentrating compartments of the electrodeionization unit. Although the concentration of ions in the reject stream from the second reverse osmosis unit may be greater than in the permeate stream from the first reverse osmosis unit, reverse osmosis membranes are good ion filters, and there will likely still be a need to inject additional salt into the concentrate loop. Furthermore, unless none of the reject Stream from the second osmosis unit is discharged as waste, the ratio of the flow rate of the EDI product stream to the flow rate of the supply stream to the first reverse osmosis unit is lower than in the system illustrated in FIG. 3 of U.S. Pat. No. 6,056,878 to Tessier et al, in which a second reverse osmosis unit is not present. The addition of a second reverse osmosis unit increases the capital and maintenance costs of the system. In a system incorporating a concentrate loop, capital and maintenance costs are associated with the recycle pump and associated piping, valves, and controls. The recycle pump, piping, valves, and controls add to the weight and bulk of a water purification system, rendering it less portable and more difficult to install in confined spaces.

In an alternative approach, a concentrate loop is not used in a water purification system incorporating an electrodeionization unit. Instead, fluid in a concentrating feed stream is continuously provided to and passed only once through the concentrating compartments with no recycle of the fluid. Such a one pass concentrating feed stream system has several advantages over a system incorporating a concentrate loop. The one pass system is simpler than a system incorporating a concentrate loop in that the recycle pump, piping, valves, and controls associated with a concentrate loop are not required, so that the one pass system has lower associated capital and maintenance costs than a system incorporating a concentrate loop. Because fresh fluid in the concentrating feed stream is continuously provided to the concentrating compartments in a one pass system, polyvalent ions and bacteria do not accumulate, so that a one pass system can require less frequent cleaning of compartment separation membranes than a system incorporating a concentrate loop. Electropure, Inc. manufactures a one pass unit, the Electropure EDI.

However, a traditional one pass system that provides a portion of the reverse osmosis permeate stream to the diluting compartments and the remainder to the concentrating compartments of an electrodeionization unit is even more consumptive of water and has a lower ratio of EDI product stream flow rate to flow rate of the supply stream to the reverse osmosis unit than a system including a concentrate loop. The large rate of consumption of water contributes to the operating cost of a traditional one pass system. The required capacity and the associated capital cost of the reverse osmosis unit for a given EDI product stream flow rate can be greater than in a system incorporating a concentrate loop. Because ions driven from the diluting compartments into the concentrating compartments are not recycled to the concentrating compartments, and the permeate from the reverse osmosis unit has a small concentration of ions, there can be a need to inject salt into the concentrating feed stream of a traditional one pass system. Such injection of salt can be needed to ensure a large conductance across the concentrating compartments and ensure energy-efficient operation of the electrodeionization unit, i.e., an acceptable energy consumption per-unit volume of purified water in the EDI product stream. For a given rate of flow of the EDI product stream, and a given composition of water in the supply stream, a traditional one pass system can require a greater rate of salt addition than a system incorporating a concentrate loop. The consumption of salt contributes to the operating cost and a salt injection device contributes to the capital and maintenance costs as well the bulk and weight of a traditional one pass system. The greater flow rate of supply stream water for a given flow rate of the EDI product stream in a traditional one pass system than in a system incorporating a concentrate loop can result in a traditional one pass water purification system being less environmentally friendly than a water purification system incorporating a concentrate loop.

There thus remains an unmet need for a water purification system that can operate for a long time before cleaning or replacement of membranes is required, is efficient in energy consumed per unit volume of purified water produced, is environmentally friendly in having a large ratio of the flow rate of the EDI product stream to the flow rate of the supply stream, is simple in design, has small capital and small maintenance costs, and is compact and has a small weight so as to be easy to transport and install.

SUMMARY OF THE INVENTION

It is therefore an object of the present invention to provide water purification systems that can operate for a long time before cleaning or replacement of membranes is required, are efficient in energy consumed per unit volume of purified water produced, are environmentally friendly in having a large ratio of the flow rate of the EDI product stream to the flow rate of the supply stream, are simple in design, have small capital and small maintenance costs, and are compact and have a small weight so as to be easy to transport and install.

An embodiment of a water purification system of the present invention includes a reverse osmosis unit, a treatment unit, and an electrodeionization unit. The reverse osmosis unit can separate a supply stream into an RO permeate stream, which has passed through a reverse osmosis filter, and an RO reject stream. The treatment unit can include a treatment membrane and can produce a treated stream by removing non-monovalent salt impurities from the RO reject stream from the reverse osmosis unit. The electrodeionization unit can produce an EDI product stream of purified water and can include a diluting compartment with a stream of flouring diluting water and a concentrating compartment with a stream of flowing concentrating fluid. A concentrating compartment can receive the treated stream from the treatment unit, and a diluting compartment can receive a diluting feed stream. The concentrating compartment can output a concentrate effluent stream.

In another embodiment of a water purification system of the present invention, the stream of flowing diluting water in the diluting compartment of the electrodeionization unit and the stream of flowing concentrating fluid in the concentrating compartment of the electrodeionization unit flow in opposite directions.

An embodiment of a water purification system of the present invention can produce an EDI product stream without recycling the concentrate effluent stream. After the treated stream has passed through a concentrating compartment of the electrodeionization unit, the treated stream can be termed a concentrate effluent stream. The concentrate effluent stream need not be recycled back to a concentrating compartment; instead, a waste unit can receive substantially all of the concentrate effluent stream.

A water purification system according to the present invention can produce an EDI product stream of purified water having a conductivity approaching the lower limit of pure water, 0.055 µS/cm. The electrodeionization unit can produce an EDI product stream of purified water with an energy consumption of less than about 2 megajoules per cubic meter of purified water. The diluting feed stream to a diluting compartment of the electrodeionization unit can include the RO permeate stream. According to the present invention, the treatment unit can be integrated with the reverse osmosis unit so that the treatment unit and the reverse osmosis unit form a single unit.

In an exemplary embodiment of the present invention, a feed pump is included. The feed pump can receive the supply stream and increase the pressure of fluid of the supply stream in order to, for example, provide fluid of the supply stream to an RO feed stream; the RO feed stream can be provided to the reverse osmosis unit. The present system can include a treatment pump, a recirculation pump, an EDI concentrate pump, or any combination of these. A treatment pump can receive the RO reject stream and increase the pressure of fluid of the RO reject stream in order to, for example, force fluid of the RO reject stream through the treatment membrane of the treatment unit at a previously determined rate. A recirculation pump can receive a portion of the RO reject stream and increase the pressure of fluid of the RO reject stream in order to, for example, recirculate fluid of the RO reject stream through the reverse osmosis unit at a previously determined rate. An EDI concentrate pump can receive the treated stream and increase the pressure of the fluid of the treated stream in order to, for example, force fluid of the treated stream through the concentrating compartments of the electrodeionization unit at a previously determined rate.

In an embodiment, the treatment membrane includes a membrane other than a brackish water or seawater reverse osmosis (RO) membrane. The treatment membrane can be, for example, a microfiltration membrane, an ultrafiltration membrane, or a nanofiltration membrane. The treatment membrane can include, for example, polyamide, cellulose acetate, polysulfone, polyvinylidene fluoride, polycarbonate, polypropylene, polyethylene, or polytetrafluoroethylene.

A water purification system of the present invention can include an ion exchange unit to receive the treated stream from the treatment unit, soften the fluid of the treated stream, and provide the softened, treated stream to the concentrating compartment of the electrodeionization unit. The present invention can also include an antiscalant agent injection device, an antibacterial agent injection device, a sodium hydroxide injection device, or a monovalent salt injection device. An antiscalant agent injection device can inject an antiscalant agent, an antibacterial agent injection device can inject an antibacterial agent, a sodium hydroxide injection device can inject sodium hydroxide, and a monovalent salt 5 injection device can inject monovalent salt into the treated stream from the treatment unit. Alternatively, an antiscalant agent injection device can inject an antiscalant agent, an antibacterial agent injection device can inject an antibacterial agent, a sodium hydroxide injection device can inject sodium hydroxide, or a monovalent salt injection device can inject monovalent salt into the RO reject stream from the reverse osmosis unit.

An embodiment of the present invention can also include a gas transfer unit having a gas transfer membrane. The gas transfer unit can receive the treated stream from the treatment unit, separate dissolved or entrained gas from water in the treated stream, and provide the degassed, treated stream to the concentrating compartment of the electrodeionization unit. Alternatively, a gas transfer unit can receive the RO reject stream from the reverse osmosis unit, separate dissolved or entrained gas from water in the RO reject stream, and provide the degassed RO reject stream to the treatment unit.

An ultraviolet light device, which irradiates the treated stream from the treatment unit, before the fluid of the treated stream enters the concentrating compartment of the electrodeionization unit, can be included. An ultraviolet light device, which irradiates the RO reject stream from the reverse osmosis unit, before the fluid of the RO reject stream enters the treatment unit, can also be included. An electrodeionization unit can include a counterflow electrodeionization unit. The treatment unit can be capable of receiving a supplemental feed stream.

In a method of water purification according to the present invention, a reverse osmosis unit separates a supply stream into an RO permeate stream and an RO reject strum. A treatment unit removes non-monovalent salt impurities from the RO reject stream and products a treated stream. The treated stream is provided to the concentrating compartment of an electrodeionization unit; the concentrating compartment outputs a concentrate effluent stream. A diluting feed stream is provided to the diluting compartment of the electrodeionization unit, and the electrodeionization unit produces an EDI product stream of purified water.

The purified water of the EDI product stream can have a conductivity of about 0.055 µS/cm. The electrodeionization unit can consume less than about 2 megajoules (MJ) of electrical energy per cubic meter of purified water in the EDI product stream produced. The treated stream, after passage through the concentrating compartment of the electrodeionization unit, can be termed a concentrate effluent stream. The concentrate effluent stream can be discharged to a waste unit, with no recycling of the concentrate effluent stream to the concentrating compartment of the electrodeionization unit. The diluting feed stream can include the RO permeate stream. The RO reject stream can be maintained at a pressure greater than atmospheric pressure between the reverse osmosis unit and the treatment unit. A supplemental feed stream can be provided to the treatment unit. in a method of water purification of the present invention, the supply water of the supply stream has a conductivity of about 3 µS/cm.

DETAILED DESCRIPTION

Embodiments of the invention are discussed in detail below, In describing embodiments, specific terminology is employed for the sake of clarity. However, the invention is not intended to be limited to the specific terminology so selected. A person skilled in the relevant an will recognize that other equivalent components can be employed and other methods developed without parting from the spirit and scope of the invention. All references cited herein are incorporated by reference as if each had been individually incorporated.

Figure 1:
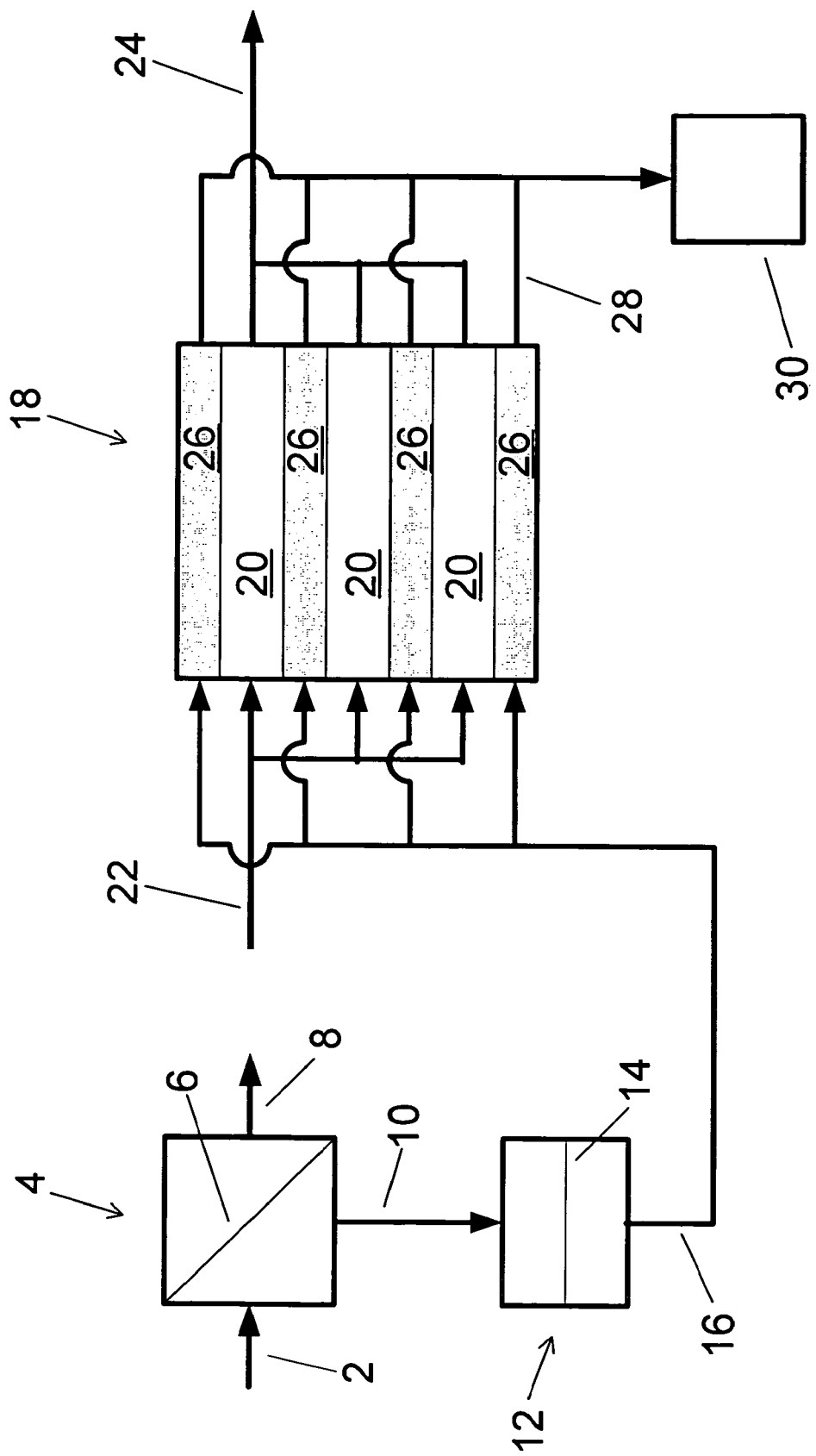
FIG. 1 is a schematic of a water purification system according to an embodiment of the invention.

In an embodiment of a water purification system according to the present invention, shown in FIG. 1, supply water in a supply stream 2 is provided to a reverse osmosis unit 4 having an RO (reverse osmosis) membrane 6. The reverse osmosis unit 4 separates the supply water in the supply stream 2 into an RO permeate stream 8, which includes water which has passed through the RO membrane 6, and into an RO reject stream 10. A treatment unit 12 receives the RO reject strum 10; a treatment membrane 14 in the treatment unit 12 removes non-monovalent salt impurities. The treatment membrane 14 can be a membrane that removes, for example, colloids, contributors to total organic carbon, bacteria, and contributors to hardness, such as certain polyvalent salts. In a polyvalent salt, one or more of the ions which associate to form the salt are polyvalent; for example, calcium carbonate, formed of $Ca^{2+}$ and $CO_3^{2-}$", is a polyvalent salt. The treatment unit 12 produces a treated stream 16. This embodiment further includes an electrodeionization unit 18, which has a diluting compartment 20, for purifying a diluting feed stream 22, through which a stream of flowing diluting water flows. The diluting feed stream issues from the diluting compartment 20, as the EDI product stream 24. The EDI product stream 24 can be used in applications requiring high water purity. The electrodeionization unit 18 also has a concentrating compartment 26, which can receive the treated stream 16, which can serve as the concentrating feed stream, from the treatment unit 12. A stream of concentrating fluid can flow through the concentrating compartment 26. The treated stream 16 can have a large concentration of monovalent ions, and, therefore, have a large conductivity and be suitable for use as the concentrating fluid in the concentrating compartment 26. Even if the treatment membrane 14 removes some monovalent ions, the treated stream 16 can have a large concentration of monovalent ions and a large conductivity, and be suitable for use in the concentrating compartment 26.

The treatment membrane 14 can be a membrane that removes, for example, colloids, contributors to total organic carbon, bacteria, and contributors to hardness, such as polyvalent salts, in the treatment unit 12 to produce the treated stream 16, so that the formation of scale and other deposits in the concentrating compartment 26 is minimized.

The electrodeionization unit 18 can therefore operate efficiently for long periods of time between servicing. This embodiment of a water purification system of the present invention thus overcomes limitations of prior art purification systems by, for example, eliminating or reducing the need for addition of antiscalant agent, antibacterial agent, or salt to the concentrating feed stream provided to the concentrating compartment 26. Thus, the period between required maintenance of the electrodeionization unit 18, for example, to clean or replace compartment separation membranes separating the diluting compartments 20 from the concentrating compartments 26, is increased. When the RO permeate stream 8 is used as the diluting feed stream 22 and the treated RO reject stream 10 is used as the concentrating feed stream provided to the concentrating compartment 26, the ratio of the flow rate of the EDI product stream 24 to the flow rate of the supply stream 2 can be large. The efficient use of water in the supply stream 2 is beneficial for the environment and reduces operating costs.

In an exemplary embodiment, the electrodeionization unit 18 is capable of efficiently purifying the diluting feed stream 22 when fluid of the treated stream 16 is passed only once through The concentrating compartment 26. The treated stream 16, after passage through the concentrating compartment 26, can be termed the concentrate effluent stream 28, and can be discharged to a waste unit 30, without being recycled back to the concentrating compartment 26, i.e., without being provided to the inlet of the concentrating compartment 26. The waste unit 30 can be, for example, a tank for storing the saline water of the concentrate effluent stream 28, an evaporation pond from which salt can eventually be recovered, or any other type of waste disposal system. Limitations of the prior art are overcome, in that the need for recycling of fluid through the concentrating compartment 26, with concomitant complexity of the water purification system, is obviated. Because the fluid need not be recycled, a recycle pump and piping, valves, and controls associated with a concentrate loop are unnecessary and can be eliminated to reduce capital and maintenance costs, reduce the overall power consumption of the water purification system, and reduce the space requirement and weight of the water purification system. A water purification system according to the present invention can consume a small amount of energy per unit volume of purified water in the EDI product stream 24 produced. That is, the system can have a high energy efficiency, because the concentration of ions in the treated stream can be sufficiently large to ensure large conductance across the concentrating compartments. When there is no concentrate loop, there is no need to control a bleed rate and a rate of addition of and a composition of make up concentrating fluid to ensure a sufficient concentration of ions in the concentrating compartments 26 or to ensure that contaminants that can foul compartment separation membranes or deposit as scale do not accumulate. A salt injection device is not necessary.

A water purification system according to the present invention can efficiently purify water without recycling the concentrate effluent stream 28 back to the inlet of the concentrating compartment 26. The water purification system according to the present invention can operate to produce an EDI product stream 24 of purified water of small conductivity.

Utilizing the present invention, the resultant EDI product stream 24 can provide purified water of a conductivity approaching the lower limit of pure water, 0.055 μS/cm. The water purification system according to the present invention can consume less than about 2 megajoules (MJ) of electrical energy for each cubic meter of purified water in the EDI product stream produced.

A water purification system of the present invention may be compared with a traditional one-pass system by, for example, comparing salt consumption. Water in the supply stream 2 may have, for example, 2.5 ppm by weight of sodium chloride and have a conductivity of approximately 5 μS/cm. A reverse osmosis unit 4 can provide, for example, a permeate stream 8 with a flow rate 90% of the supply stream 2, and a reject strum 10 with a flow rate 10% of the supply stream 2. The reject stream 10 can then have 25 ppm of sodium chloride, and have a conductivity of approximately 50 liSkm. In a water purification system of the present invention, the reject stream 10 can be treated and the treated stream 16, without the addition of any salt, can be provided to the concentrating compartments 26 of the electrodeionization unit 18. By contrast, a traditional one-pass system provides a fraction of the permeate stream from a reverse osmosis unit as the concentrating feed stream to the concentrating compartments. Therefore, approximately 25 grams of sodium chloride per cubic meter of the concentrating feed stream must be added to provide a concentrating feed stream of approximately 50 μS/cm to the concentrating compartments.

In another embodiment, a recycle pump circulates some of the concentrate effluent stream back to the inlet of the concentrating compartment 26. The recycle pump can serve to increase the flow rate through the concentrating compartment 26 above the flow rate of the treated stream.

Figure 2:
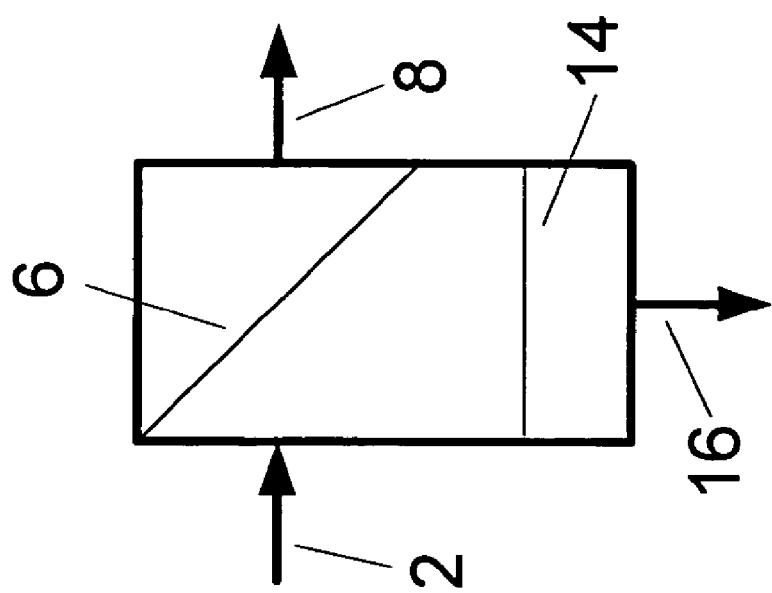
FIG. 2 is a schematic of an integrated reverse osmosis and treatment unit according to an embodiment of the invention.

In an embodiment, the RO permeate stream 8 is provided as the diluting feed stream 22 to the diluting compartment 20 of the electrodeionization unit 18. The treatment unit 12 can be integrated with the reverse osmosis unit 4 so that the treatment unit 12 and the reverse osmosis unit 4 form a single unit, as shown in FIG. 2. An advantage of such a single-unit design is that the water purification system as a whole can be made more compact and have lighter weight. A more compact, lighter weight system is desirable in that, for example, it can be readily transported, installed in confined spaces, and takes up less laboratory or production floor space.

The RO reject stream 10 can be maintained at a pressure greater than atmospheric pressure after exiting the reverse osmosis unit 4 and before entering the treatment unit 12, as opposed to allowing the RO reject stream 10 to return to atmospheric pressure and then increasing the pressure with a pump to force the Rt.) reject stream 10 through the treatment membrane 14 of the treatment unit 12. By maintaining greater than atmospheric pressure in the RO reject stream 10, the energy consumed by the system per unit volume of purified water produced is less than in the case in which the RC) reject stream 14 is allowed to return to atmospheric pressure before being forced through the treatment unit 12. Thus, in some embodiments, a pump to increase the pressure of the RO reject stream 10 before it is provided to the treatment unit 12 is not necessary. Elimination of such a pump results in saving of power required by the water purification system, saving of capital cost, saving of maintenance costs, and reduction of space required for and weight of the system.

Figure 3:
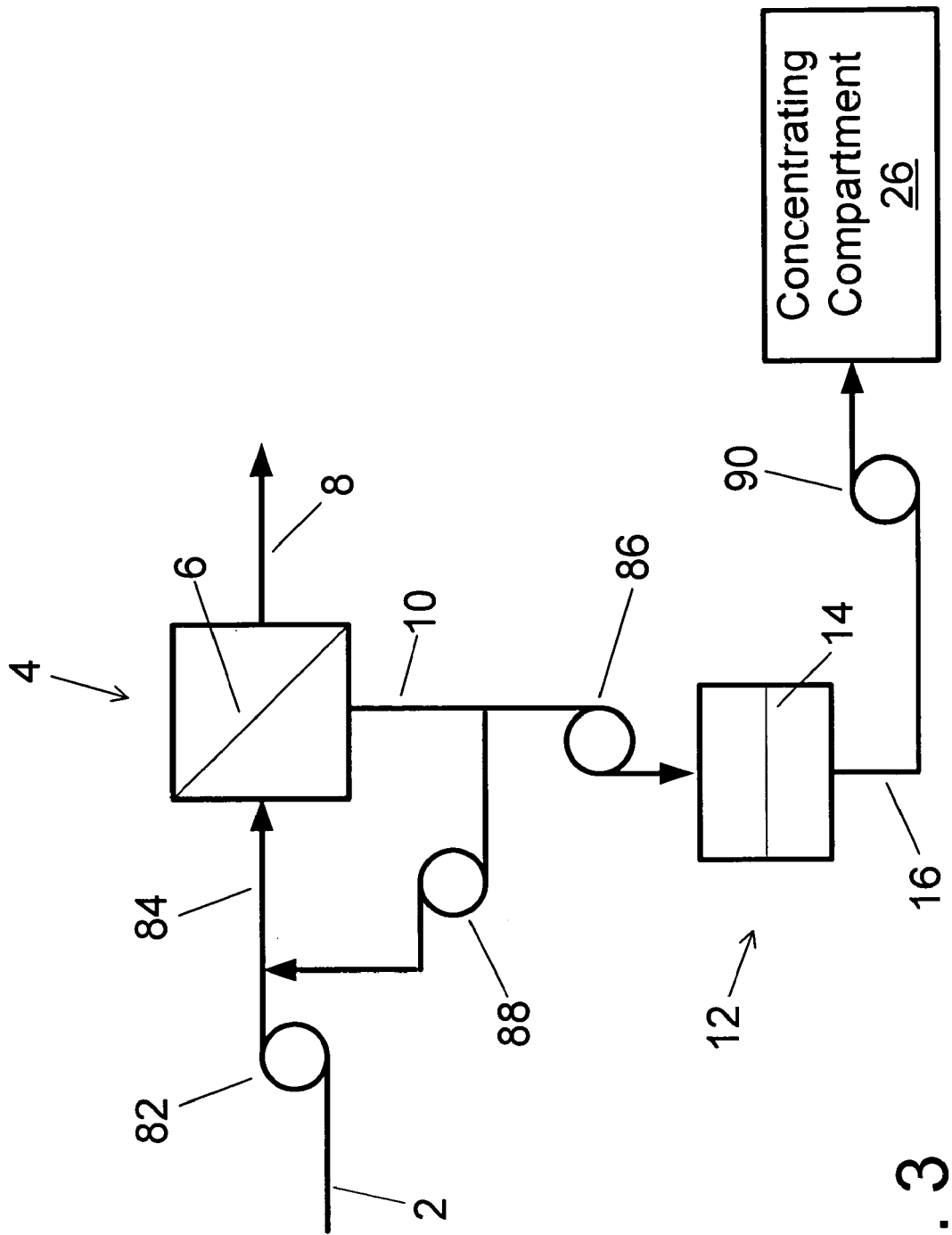
FIG. 3 is a schematic showing optional components of a water purification system according to the invention.

In an embodiment of the invention, a water purification system can include one or more pumps to increase fluid pressure in the system. The various pumps that can be used are illustrated in FIG. 3, it being understood that not all of the pumps shown are necessarily used in a particular application. For example, a feed pump 82 can be used to increase the pressure of supply water provided in the supply stream 2 to a high pressure in an RO feed stream 84 that is provided to the reverse osmosis unit 4, in order to force permeate through the RO membrane 6 of the reverse osmosis unit 4 at a previously determined rate.

A treatment pump 86 can receive the Rte reject stream 10 and increase the pressure of fluid of the RO reject stream 10 in order to, for example, force fluid of the 11.f3 reject stream 10 through the treatment membrane 14 of the treatment unit 12 at a previously determined rate. A recirculation pump 88 can be included to receive a portion of the RO reject stream 10, increase the pressure of the portion, and provide the portion to a supply stream 2 or an RO feed stream 84 in order to, for example, recirculate fluid through the reverse osmosis unit 4. Such recirculation can be used to achieve a higher cross-flow velocity of fluid across the surface of the Rte membrane 6 for a given flow rate of the supply stream 2 and a given ratio of the flow rate of the RO permeate stream 8 to the flow rate of the supply stream 2. A high cross flow velocity may be desirable, for example, to maintain a clean RO membrane 6 which operates efficiently, i.e., allows a high flow rate of permeate through the RO membrane 6 for a given pressure drop across the RO membrane 6. In some embodiments, an ED] concentrate pump 90 receives the treated stream 16 and increases the pressure of fluid of the treated stream 16 in order to, for example, force fluid of the treated stream 16 through the concentrating compartment 26 of the electrodeionization unit 18 at a previously determined rate.

For embodiments using a plug-flow filter in the treatment unit 12, additional pumps, holding tanks, piping, and valves may be required to allow for cleaning of the plug-flow filter by backwash, as is known in the art.

The treatment membrane 14 of the treatment unit 12 can remove non-monovalent salt impurities from the RO reject stream 10 of the reverse osmosis unit 4 to produce the treated stream 16, but allow a substantial quantity of monovalent ions to pass from the RO reject stream 10 into the treated stream 16. The treatment membrane can include a membrane other than a brackish water or seawater reverse osmosis membrane. The treatment membrane 14 of the treatment unit 12 can be, for example, a microfiltration membrane, an ultrafiltration membrane, or a nanofiltration membrane, such as those available in the art. A treatment membrane 14 can include, for example, polyamide, cellulose acetate, polysulfone, polyvinylidene fluoride, polycarbonate, polypropylene, polyethylene, and polytetrafluoroethylene.

Nanofiltration membranes are thought to have pores which are larger than the pores in reverse osmosis membranes. Nanofiltration membranes can remove a large fraction of polyvalent salts present, but either do not remove monovalent salts, e.g., sodium chloride, or remove only a small fraction of monovalent salts. Thus, a nano.filtration membrane can be useful as a treatment membrane 14 to remove polyvalent salts responsible.for water hardness, which can cause scaling and fouling of compartment separation membranes separating diluting compartments 20 and concentrating compartments 26 of the electrodeionization unit 18, while passing monovalent salts, e.g., sodium chloride, in solution so that the monovalent salt ions cause the treated stream 16 to have a large conductivity. A large conductivity of the treated stream 16 increases the conductance across the concentrating compartments 26 of the electrodeionization unit 18 and, therefore, improves the efficiency of the electrodeionization unit 18, i.e., reduces the electrical energy consumed by the electrodeionization unit IS per unit volume of purified water in the ED product stream 24 produced.

An ion exchange unit can receive the treated stream 16 from the treatment unit 12, and soften the fluid of the treated stream 16. The softened, treated stream can then be provided to the concentrating compartment 26 of the electrodeionization unit 18. For example, an ion exchange unit can accept the treated stream 16 from a treatment unit 12 that incorporates a microfiltration or ultrafiltration membrane as the treatment membrane 14. The ion exchange resin is understood to convert salts such as calcium carbonate or magnesium carbonate to more soluble sodium salts, thus reducing scaling and fouling in the electrodeionization unit 18.

Water purification systems of the present invention can include additional components used in prior art systems. For example, the water purification system can include an antiscalant agent injection device which can inject an antiscalant agent into the treated stream 16 from the treatment unit 12 before the treated stream 16 enters the concentrating compartment 26 of the electrodeionization unit 18. Examples of antiscalant agents include sulfuric acid, hydrochloric acid, polyacrylic acid, poly(acrylic-ca-sulfonate), phosphonate antisealants, sodium hexametaphosphate, EDTA complexing agent, CDTA complexing agent, amido succinic acid chelating agent, sodium bisulphite, and combinations of these and other antiscalant agents.

The water purification system can include an antibacterial agent injection device. The antibacterial agent injection device can inject an antibacterial agent into the treated stream 16 from the treatment unit 12 before fluid of the treated stream 16 enters a concentrating compartment 26 of the electrodeionization unit 18.

The water purification system can include a sodium hydroxide injection device. The sodium hydroxide injection device can inject sodium hydroxide into the treated stream 16 from the treatment unit 12 before fluid of the treated stream 16 enters a concentrating compartment 26 of the electrodeionization unit 18. The injected sodium hydroxide reacts with carbon dioxide dissolved in the water to form sodium carbonate and sodium bicarbonate which remain in solution and do not produce scaling or fouling in the electrodeionization unit 18.

The water purification system can include a monovalent salt injection device for injecting monovalent salt into the fluid of the treated stream 16, before the treated stream 16 enters the concentrating compartment 26 of the electrodeionization unit 18. A monovalent salt injection device can be useful, for example, when the concentration Of monovalent salt in the supply stream 2 can fluctuate below a minimum desired concentration. A minimum concentration of monovalent salt in the supply stream 2 is required to ensure sufficient concentration of monovalent salt in the concentrating compartment 26 with a sufficient flow rate of the treated stream 16. The sufficient concentration of monovalent salt in the concentrating compartment 26 can provide a large conductance across the concentrating compartment 26. The sufficient flow rate of the treated stream 16 can be required, for example, to minimize the rate of deposition of bacteria on the compartment separation membranes of the electrodeionization unit 18, minimize the deposition of salt on the compartment separation membranes, maintain a thin boundary layer adjacent to the compartment separation membranes to promote efficient transport of ions across the membranes and into the concentrating compartments 26, and to ensure the transfer of heat out of the electrodeionization unit 18. As another example, a water purification system of the present invention incorporating a monovalent salt injection device can be appropriate when a user provides a supply stream with an insufficient concentration of monovalent salt ions, but wishes to minimize the amount of monovalent salt which must be added and eventually disposed.

When the concentration of monovalent salt in the supply stream 2 is small, and it is not practical or not desired to include a monovalent salt injection device in the water purification system according to the present invention, the ratio of the flow rate of the RO permeate stream 8 to the flow rate of the RO reject stream 10 can be increased. The ratio of the concentration of monovalent salt in the RO reject stream 10 to the concentration of monovalent salt in the supply stream 2 will be concomitantly increased. By setting the ratio of the flow rate of the Rte permeate stream 8 to the RO reject stream 10 sufficiently large, a sufficient concentration of monovalent salt in the concentrating compartment 26 can be attained. However, if the ratio of the flow rate of the RO permeate stream 8 to the RO reject stream 10 is increased to too large a value, the flow rate of the treated stream 16 will be insufficient. To ensure both a sufficient concentration of monovalent salt in the concentrating compartment 26 and a sufficient flow rate of the treated stream 16, in an embodiment, a supplemental feed stream having a larger concentration of monovalent salt than the supply stream 2 is provided to the treatment unit 12.

The water purification system can also include an antiscalant agent injection device which can inject an anti sealant agent into the Rte reject stream 10 from the reverse osmosis unit 4, before the Rte reject stream 10 enters the treatment unit 12. The water purification system can also include, for example, an antibacterial agent injection device which injects an antibacterial agent into the. RO reject stream 10, a sodium hydroxide injection device which injects sodium hydroxide into the RO reject stream 10, and/or monovalent salt injection device which injects sodium hydroxide into the RO reject stream Dissolved or entrained gas can be removed from water with a gas transfer unit having a gas transfer membrane. For example, carbon dioxide can be removed with such a gas transfer unit. The gas transfer unit can receive the treated stream 16, separate dissolved or entrained gas from water in the treated stream 16, and then provide the degassed, treated stream to the concentrating compartment 26 of the electrodeionization unit 18. Alternatively, the gas transfer unit can receive the RO reject stream 10, separate dissolved or entrained gas from water in the RO reject stream 10, and then provide the degassed, treated stream to the treatment unit 12.

The water purification system can include an ultraviolet light device. The device can irradiate the treated stream 16 from the treatment unit 12 with ultraviolet light before the treated stream 16 enters the concentrating compartment 26 of the electrodeionization unit 18. Alternatively, an ultraviolet light device can irradiate the RO reject stream 10 from the reverse osmosis unit 4 with ultraviolet light before the R6 reject stream 10 enters the treatment unit 12.

Figure 4:
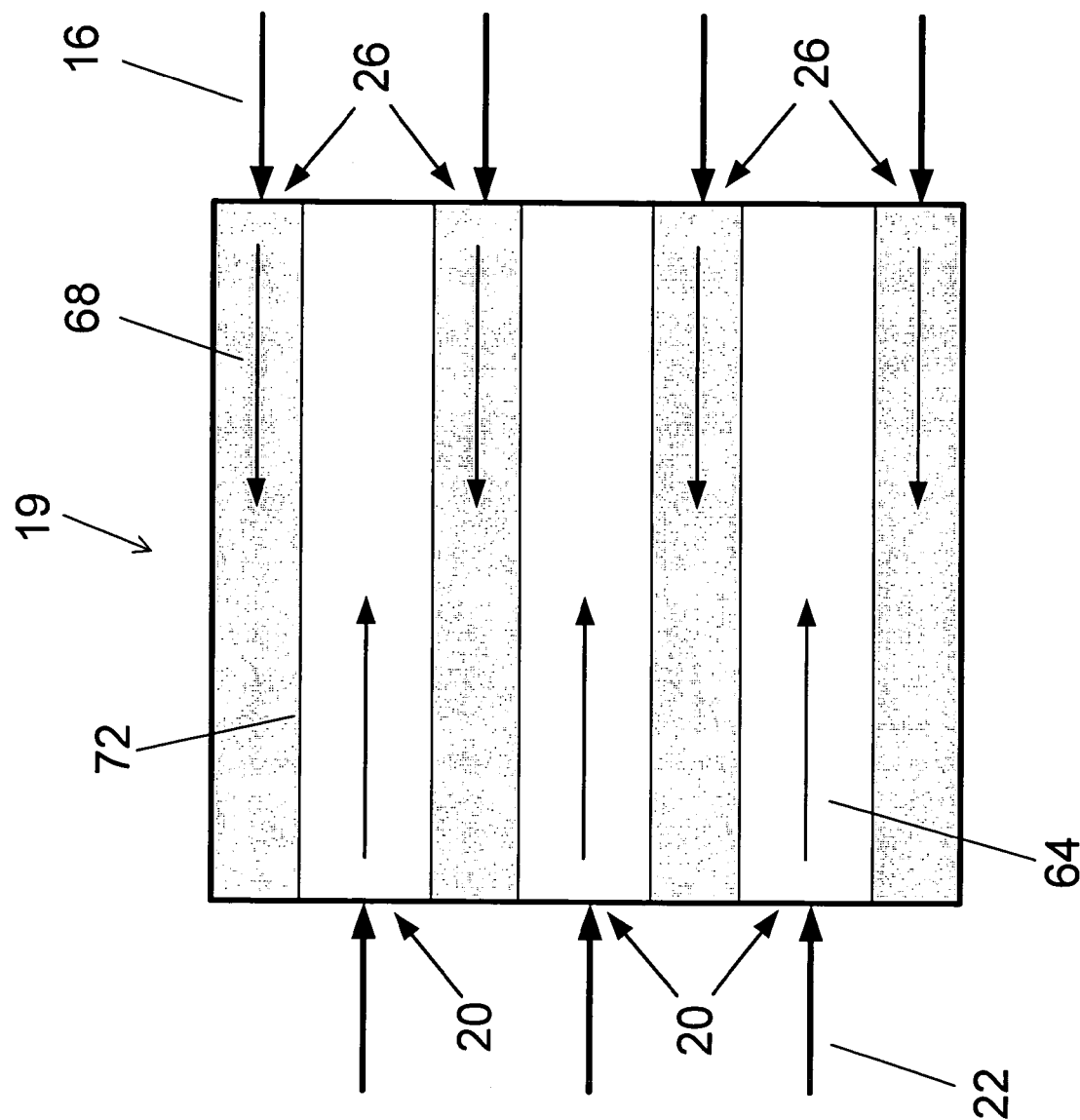
FIG. 4 is a schematic of an electrodeionization unit with a counterflow configuration that can be used with the invention.

FIG. 4 illustrates a counterflow electrodeionization unit 19 having a counterflow configuration, i.e., a stream of flowing diluting water 64 in a diluting compartment 20 of the counterflow electrodeionization unit 19 flows in a direction opposite to that of a stream of flowing concentrating fluid 68 in a concentrating compartment 26. The counterflow electrodeionization unit 19 can be used as the electrodeionization unit in a water purification system of the present invention. The compartment separation membrane 72 separates a diluting compartment 20 from a concentrating compartment 26. T be mass of an ionic species transferred from a diluting compartment 20 to a concentrating compartment 26 per unit time for a given area of the compartment separation membrane 72 can be greater for a counterflow configuration, than for a parallel flow configuration.

In a method for purifying water according to the present invention, supply water in a supply stream 2 is separated into an RO permeate stream 8 and an RO reject stream 10 with a reverse osmosis unit 4. Mort-monovalent salt impurities can be removed from the RO reject stream 10 with a treatment unit 12 to produce a treated stream 16. The treated stream 16 can be provided to a concentrating compartment 26 of an electrodcionix. Lion unit 18. A diluting .feed stream 22 can be processed in a diluting compartment 20 of the electrodeionization unit 18, and the electrodeionization unit 18 can produce an EDI product stream 24 of purified water. In a method, the supply stream 2 has a conductivity of about 3.µS/cm.

The treated stream 16, after passing through the concentrating compartment 26, can be discharged to a waste unit 30, with no recycle of the treated stream 16 to the compartment 26. The RO permeate stream S can be provided as the diluting feed stream 22 to the diluting compartment 20 of the electrodeionization unit 18. The RO reject stream 10 can be maintained at greater than atmospheric pressure after the 1 W reject stream 10 exits the reverse osmosis unit 4 and before the RO reject stream 10 enters the treatment unit 12.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. it is therefore to be understood that, within the scope of the claims and their equivalents, the invention may be practiced otherwise than as specifically described.

What is claimed is:

1. A method for purifying water, comprising the steps of: separating a supply stream into an RO permeate stream and an RO reject stream with a reverse osmosis unit; providing the RO reject stream to a nanofiltration membrane; removing non-monovalent salt impurities from the RO reject stream with said nanofiltration membrane unit to produce a treated stream; providing the treated stream to a concentrating compartment of an electrodeionization unit; outputting a concentrate effluent stream from said concentrating compartment; providing a diluting feed stream to a diluting compartment of said electrodeionization unit, feeding said RO permeate stream to said diluting feed stream; and, producing an EDI product stream of purified water with said electrodeionization unit, said method producing said EDI product stream without using a recycle pump for recycling the concentrate effluent stream back to said concentrating compartment or said reverse osmosis unit.

2. The method of claim 1, wherein the supply stream has a conductivity of about 3 µS/cm.

3. The method of claim 1, wherein the EDI product stream has a conductivity of about 0.055 µS/cm.

4. The method of claim 1, wherein said electrodeionization unit consumes less than about 2 megajoules of electrical energy per cubic meter of purified water in the EDI product stream produced.

5. The method of claim 1, further comprising the step of discharging the concentrate effluent stream to a waste unit.

6. The method of claim 1, further comprising the step of maintaining the RO reject stream at a pressure greater than atmospheric pressure between said reverse osmosis unit and said treatment unit.

7. The method of claim 1, further comprising the step of providing a supplemental feed stream to said treatment unit.

\* \* \* \* \*